(12) United States Patent
Wan et al.

(10) Patent No.: US 12,314,797 B2
(45) Date of Patent: May 27, 2025

(54) SINGLE-CARD HOLDER, ELECTRONIC DEVICE, AND CARD HOLDER RECOGNITION METHOD

(71) Applicant: HONOR DEVICE CO., LTD., Shenzhen (CN)

(72) Inventors: Wang Wan, Shenzhen (CN); Qiansheng Liu, Shenzhen (CN); Yi Luo, Shenzhen (CN); Fang Ding, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/700,220

(22) PCT Filed: Apr. 11, 2023

(86) PCT No.: PCT/CN2023/087686
§ 371 (c)(1),
(2) Date: Apr. 10, 2024

(87) PCT Pub. No.: WO2023/216795
PCT Pub. Date: Nov. 16, 2023

(65) Prior Publication Data
US 2025/0013836 A1      Jan. 9, 2025

(30) Foreign Application Priority Data

May 9, 2022   (CN) .......................... 202210503493.5

(51) Int. Cl.
*G06K 7/00*      (2006.01)
*H04B 1/3818*    (2015.01)

(52) U.S. Cl.
CPC ......... *G06K 7/0069* (2013.01); *G06K 7/0073* (2013.01); *H04B 1/3818* (2015.01)

(58) Field of Classification Search
CPC .. G06K 7/0069; G06K 7/0073; H04B 1/3818; H04B 1/3816; G06V 10/225; H04M 1/02; H04M 1/026
See application file for complete search history.

(56) References Cited

U.S. PATENT DOCUMENTS

| | | | |
|---|---|---|---|
| 7,247,055 B2 * | 7/2007 | Watanabe | H01R 13/639 439/325 |
| 2002/0101722 A1 * | 8/2002 | Oguchi | G06K 13/0856 361/728 |

(Continued)

FOREIGN PATENT DOCUMENTS

| | | |
|---|---|---|
| CN | 104320506 A | 1/2015 |
| CN | 206163789 U | 5/2017 |

(Continued)

*Primary Examiner* — Tuyen K Vo
(74) *Attorney, Agent, or Firm* — WOMBLE BOND DICKINSON (US) LLP (57) ABSTRACT

This application relates to the technical field of card holder structures, and provide a single-card holder, an electronic device, a card holder recognition method, and a card holder assembly method. The single-card holder includes a card holder body and a filler. The single-card holder has an identifier region for forming an identifier. The card holder body includes a first slot and a second slot. The first slot is configured to mount a card member. The second slot is the same as or different from the first slot. The filler is filled in the second slot, and at least corresponds to part of the identifier region. The electronic device includes a card base and the single-card holder. The single-card holder matches the card base.

20 Claims, 11 Drawing Sheets

(56) References Cited

U.S. PATENT DOCUMENTS

2003/0010828 A1\* 1/2003 Hirata ................. G06K 7/0008
235/486
2013/0225003 A1 8/2013 Liu

FOREIGN PATENT DOCUMENTS

| | | | |
|---|---|---|---|
| CN | 207053492 U | 2/2018 | |
| CN | 209045821 U | 6/2019 | |
| CN | 110312246 A | 10/2019 | |
| CN | 112382876 A | 2/2021 | |
| CN | 212850478 U | 3/2021 | |
| CN | 112382876 B | 3/2022 | |
| CN | 216028872 U | 3/2022 | |
| EP | 1429283 A2 \* | 6/2004 | ........... G06K 19/041 |
| JP | 2003030600 A \* | 1/2003 | |
| JP | 2015011954 A \* | 1/2015 | ......... G06K 13/0831 |
| WO | 2016145884 A1 | 9/2016 | |

\* cited by examiner

FIG. 12

SINGLE-CARD HOLDER, ELECTRONIC DEVICE, AND CARD HOLDER RECOGNITION METHOD

CROSS-REFERENCE TO RELATED APPLICATIONS

This application is a national stage of International Application No. PCT/CN2023/087686, filed on Apr. 11, 2023, which claims priority to Chinese Patent Application No. 202210503493.5, filed on May 9, 2022. The disclosures of both of the aforementioned applications are hereby incorporated by reference in their entireties.

TECHNICAL FIELD

This application relates to the field of card holder structures, and specifically to a single-card holder, an electronic device, and a card holder recognition method.

BACKGROUND

Some electronic devices (such as mobile phones) are provided with card holders for carrying card members (such as SIM cards). Some of which the card holders in known technologies directly use a double-card holder version as a single-card holder, or only one of the slots in the double-card holder gives an indication that the slot is not in use, which cannot prevent users from mounting two cards on the double-card holder.

Based on requirements of clients or other reasons, in some cases, a double-card holder version and a single-card holder version need to be designed for the electronic device. However, in the known technologies, a double-card holder may be mounted in a scenario where a single-card holder is required to be configured, and cannot be reliably detected and recognized.

SUMMARY

This application provides a single-card holder, an electronic device, and a card holder recognition method, to solve the problem that a double-card holder mounted in a single-card holder configuration scenario cannot be reliably detected and recognized.

In a first aspect, an embodiment of this application provides a single-card holder, which includes a card holder body and a filler. The single-card holder has an identifier region for forming an identifier. The card holder body includes a first slot and a second slot. The first slot is configured to mount a card member. The second slot is the same as or different from the first slot. The filler is filled in the second slot, and at least corresponds to part of the identifier region.

In the single-card holder in this embodiment of this application, the filler is filled in the second slot, so that a card member cannot be mounted in the second slot, to achieve physical fool proofing. Furthermore, the filler of the second slot of the single-card holder corresponds to the identifier region, so that a complete identifier cannot be formed in the identifier region. Therefore, after an identifier operation is performed on a card holder, if a complete identifier can be detected, it is determined that the card holder is not a single-card holder, and shall be prevented from being mounted in an electronic device of a single-card version.

In a possible implementation, a material of a surface of the filler away from a slot bottom surface of the second slot is different from a material of the slot bottom surface of the second slot, so that the identifier cannot be completely formed on the surface of the filler away from the slot bottom surface of the second slot.

In this implementation, due to different materials, a complete identifier may be unable to be formed in a corresponding position of the single-card holder provided with the filler, to recognize whether a card holder is a single-card holder.

In a possible implementation, the identifier is a laser engraved identifier; the material of the slot bottom surface of the second slot includes a metal; and the material of the surface of the filler away from the slot bottom surface of the second slot includes plastic.

In this implementation, the filler made of a plastic material may prevent the laser engraved identifier from forming thereon.

In a possible implementation, a region of the filler corresponding to the identifier region is provided with a notch, and a cross section of the notch is smaller than the identifier region.

In this implementation, by disposing the notch, the identifier possibly formed may be disconnected on different surfaces to be unable to be recognized.

In a possible implementation, the identifier region is in a bar shape; a plurality of notches are provided; and the plurality of notches are arranged at intervals in a length direction of the identifier region.

In this implementation, the plurality of notches may make the identifier disconnected respectively at a plurality of positions, so that the incompleteness of the identifier is further improved, and the identifier is more difficult to recognize.

In a possible implementation, the notch runs through the filler, or a recessed depth of the notch is less than the filler.

In this implementation, the notch may be disposed to run through the filler, in this case, part of the identifier may be formed, but a portion at which the filler is not provided with the notch is still unable to form the identifier; and the recessed depth of the notch is less than the filler, so that there is a height difference in a portion of the surface of the filler corresponding to the identifier region, and it is also difficult to form a complete recognizable identifier.

In a possible implementation, the filler and the card holder body are formed integrally, or the filler is fixedly connected to the card holder body by a connection structure.

In this implementation, the filler may be integrally formed with the card holder body, so that convenient processing is achieved; and the formed filler may also be assembled on the card holder body in a detachable manner.

In a possible implementation, the connection structure is an engagement connection structure, an adhesive connection structure, or a threaded connection structure.

In this implementation, the engagement connection structure may include a notch and a protrusion, which match each other; the bonded connection structure may include an adhesive layer; and the threaded connection structure may include a screw; etc.

In a possible implementation, the first slot and the second slot are respectively located on opposite surfaces of the card holder body.

In this implementation, the first slot and the second slot are located on the opposite surfaces, so that two positions for mounting card members may be conveniently designed in a small plate surface of the card holder body.

In a possible implementation, the card holder body includes an outer frame and a support plate. An inner space is defined by the outer frame, and the inner space runs through a thickness direction of the outer frame. The support plate has a first plate surface and a second plate surface, which are opposite to each other. The support plate is connected to a middle position of the thickness direction of the outer frame, and divides the inner space into the first slot and the second slot that face towards opposite directions. A slot bottom surface of the first slot is defined by the first plate surface, and the slot bottom surface of the second slot is defined by the second plate surface. The identifier region is located on a side of the second plate surface.

In this implementation, the first slot and the second slot can be conveniently formed by the outer frame and the support plate.

In a possible implementation, the support plate is a metal plate, and the outer frame and the filler are an integrally-formed plastic structure.

In this implementation, the support plate is made of metal, so that higher support strength can be provided. The outer frame and the filler are made of plastic, so that a complex structure is formed to match the card base and the card member. In addition, the support plate and the filler are made of different materials, so that a material of a second plate surface (i.e., the slot bottom surface of the second slot) of the support plate is different from a material of the surface of the filler. In this way, the identifier that can be formed on the second plate surface cannot be completely or clearly formed on the surface of the filler, so that the single-card holder can be recognized.

In a second aspect, an embodiment of this application further provides an electronic device, which includes a card base and the single-card holder. The single-card holder matches the card base.

The electronic device in this embodiment of this application uses the single-card holder, and a double-card holder is not likely to be mounted during assembly, so that a quality problem due to mounting of an erroneous card holder is reduced.

In a third aspect, an embodiment of this application further provides a card holder recognition method, which is used for recognizing whether a card holder is the single-card holder and includes the following operations.

An identifier forming operation is performed on an identifier region of a selected card holder.

Identifier recognition is performed. If the identifier cannot be recognized or the complete identifier cannot be recognized, it is determined that the card holder is the single-card holder, and the card holder is to be assembled in an electronic device of a single-card version. If the complete identifier can be recognized, it is determined that the card holder is a double-card holder of a double-card version corresponding to the single-card holder, and the card holder is to be assembled in an electronic device of the double-card version.

In a possible implementation, the identifier forming operation includes laser engraving, spraying, or mechanical marking.

In this implementation, a laser engraved identifier, a sprayed identifier, or a mechanically-marked identifier can be formed by laser engraving, spraying, or mechanical marking.

According to the card holder recognition method in this embodiment of this application, whether a card holder is a single-card holder can be reliably recognized, so that the problem of mounting single cards and double cards can be reliably reduced, to guarantee the quality of an assembled electronic device.

In a possible implementation, the electronic device includes a mobile phone, and the card holder is configured to hold a SIM card of the mobile phone. The card holder recognition method further includes the following operations.

The card holder is placed on a laser engraving fixture, and a laser engraving operation of an IMEI code is performed on a side of the card holder; and the IMEI code corresponds to the mobile phone matching the card holder.

The card holder is taken out to try to read the IMEI code, and read information is compared with the IMEI code of the mobile phone.

If the read information is the same as the IMEI code of the mobile phone, it is determined that the card holder is the double-card holder and is to be assembled in the electronic device of the double-card version. If the read information is different from the IMEI code of the mobile phone, it is determined that the card holder is the single-card holder and is to be assembled in the electronic device of the single-card version.

In this implementation, through the laser engraving of the IMEI code and comparison analysis, whether a card holder to be assembled in a mobile phone is a single-card holder or a double-card holder can be reliably recognized, so that the mounting of the single-card holder and the double-card holder can be reliably avoided, and the quality of the mobile phone is ensured.

BRIEF DESCRIPTION OF DRAWINGS

To describe the technical solutions of embodiments of this application more clearly, the following briefly describes the accompanying drawings of the embodiments. It should be understood that, the following accompanying drawings show only some embodiments of this application, which cannot be considered as limitation on the scope. A person of ordinary skill in the art may still derive other accompanying drawings from the accompanying drawings without creative efforts.

In the drawings:
Electronic device 100
Body 10
Card base 11
Card holder 30
Single-card holder 30a
Double-card holder 30b
Pressure wall 31
Support portion 31a
Filler 33
Card holder body 35
Support plate 36
Outer frame 37
First slot C1
Second slot C2
Bar-shaped cut slot C3
Notch C4
Hollow hole K1
First plate surface P1
Second plate surface P2
Inner space Q1
Identifier region S1
Thickness direction Y1
Length direction Y2
Card holder assembly device 200
Card holder recognition device 210
Identifier assembly 211
Recognition assembly 212
Assembled assembly 220

DESCRIPTION OF EMBODIMENTS

The technical solutions in embodiments of this application are clearly and completely described below with reference to the accompanying drawings in embodiments of this application. Apparently, the described embodiments are merely some rather than all of embodiments of this application.

It is to be noted that, when an element is referred to as "being fixed to" another element, the element may be directly on the another element, or an intervening element may be present. When an element is expressed as being "connected to" another element, the element may be connected to the another component directly, or via an intermediate element. When an element is expressed as being "disposed on" another element, the element may be disposed on the another element directly, or via an intermediate element. The terms "vertical", "horizontal", "left", and "right" and similar expressions used here are merely used for the purpose of description.

Unless otherwise defined, meanings of all technical and scientific terms used in this specification are the same as that usually understood by a person skilled in the art to which this application belongs. In this application, terms used in the specification of this application are merely intended to describe objectives of the specific implementations, but are not intended to limit this application. The term "or/and" used here includes any or all combinations of one or more related listed items.

Some implementations of this application are described below in detail. The implementations and features in the implementations may be combined with each other in the case of no conflict.

Embodiment

This embodiment provides an electronic device, such as a mobile phone, a tablet computer, a notebook computer, a smart bracelet, and the like. In some cases, these electronic devices needs to be provided with card holders to achieve an operation of inserting a card.

Figure 1:
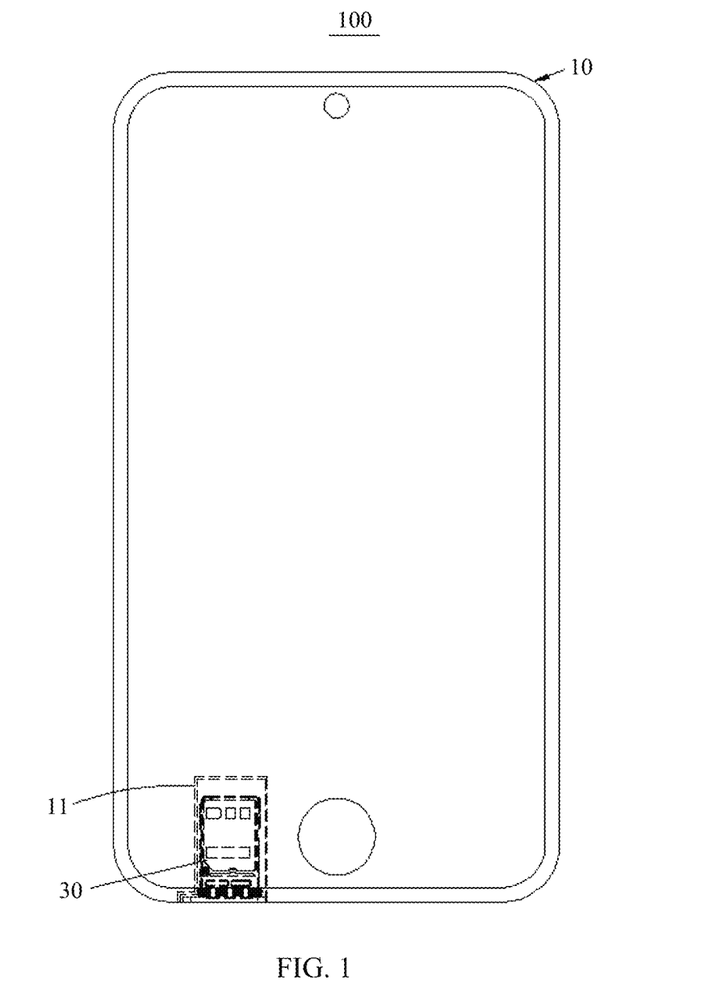
FIG. 1 is a schematic structural diagram of an electronic device according to an embodiment of this application.

FIG. 1 shows an electronic device 100 in an example implementation. Referring to FIG. 1, the electronic device 100 includes a body 10 and a card holder 30. The body 10 is provided with a card base 11 for matching the card holder 30. The card holder 30 is to carry a card member (not shown in the figure), such as a Subscriber Identity Module (SIM) card (Subscriber Identity Module Card), a memory card, a flash memory card, etc.

In some cases, the electronic device 100 needs to be simultaneously compatible with card members of different versions. For example, the electronic device 100 (such as the mobile phone) provided with the SIM card sometimes needs to be compatible with both single-card and double-card versions, that is, the card base 11 matches a single-card holder and also matches a double-card holder. For example, as a common electronic device 100, responding to market requirements in different sales regions, mobile phones need to be provided with the single-card holders in some regions, to carry a single SIM card, and the mobile phones need to be provided with the double-card holders in some regions, to carry two SIM cards.

By using the mobile phone as an example, in a production line of the electronic device 100 (mobile phone), card holder 30 testing and assembly processes include the following steps.

An SIM card is placed in the card holder 30, and the card holder 30 and the SIM card are inserted in the mobile phone together for a power-on test.

The card holder 30 is taken out and placed on a fixture, and an International Mobile Equipment Identity (International Mobile Equipment Identity. IMEI) code of the mobile phone is laser-carved on the card holder 30.

The card holder 30 is taken out, the IMEI code formed through laser engraving is read, and whether the read IMEI code is correct is verified.

The card holder 30 passing the verification is normally assembled to the mobile phone, and the card holder 30 failing the verification cannot be used or is not used for the mobile phone of the version.

For example, the IMEI code may also be replaced with the name of a product, any shape, and the like: the formed IMEI code, name, shape, or other identifiers may be visible or invisible. The laser engraving coding mode may also be exemplarily replaced with spraying, mechanical marking, etc., and is not limited in embodiments of this application.

In the known technologies, the production line achieving the test and assembly is relatively fixed in line arrangement and devices, and mainly produces double-card holders matching double SIM cards; and when card holders of single-card versions are required, a no-use prompt is simply provided at one of SIM card slots of the double-card holder, for example, prompting information such as "do not use this card slot", "NO-USE", and the like is added on a slot bottom surface of the card slot on one side. However, such solution does not meet the needs of some clients, and cannot efficiently reduce situations of wrongly mounting the single-card holders and the double-card holders. Changing the production line or devices on a large scale is costly and may affect normal production supply requirements. Therefore, how to effectively preventing the single-card holders and the double-card holders from being wrongly mounted while maintaining the structure of the production line as much as possible is an urgent problem to be solved.

The card holder 30 provided in embodiments of this application has a double-card version (referring to a double-card holder 30b shown in FIG. 2 to FIG. 5) and a single-card version (referring to a single-card holder 30a shown in FIG. 6 to FIG. 10). The single-card holder 30a can physically prevent the mounting of two card members, to achieve physical fool proofing, and can reliably avoid the problem of erroneous mounting of single and double cards. Details are described below:

Referring to FIG. 2 to FIG. 5, the double-card holder 30b includes an outer frame 37 and a support plate 36. An inner space Q1 is defined by the outer frame 37, and the inner space Q1 runs through a thickness direction Y1 of the outer frame 37.

The support plate 36 has a first plate surface P1 and a second plate surface P2, which are opposite to each other. The support plate 36 is connected in a middle position of the thickness direction Y1 of the outer frame 37, and divides the inner space Q1 into the first slot C1 and the second slot C2, which face towards opposite directions; and the shape of the first slot C1 may be the same as or different from the shape of the second slot C2. In the double-card holder 30b, both the first slot C1 and the second slot C2 may be configured to mount card members such as SIM cards. A slot bottom surface of the first slot C1 is defined by the first plate surface P1, and the slot bottom surface of the second slot C2 is defined by the second plate surface P2; and a side of the second plate surface P2 has an identifier region S1, which is used for forming an identifier. For example, when the identifier needs to be formed, an identifier device (e.g., a laser engraving device) is made corresponds to the identifier region S1 to emit laser, and a laser engraved identifier is formed in the identifier region S1.

In this embodiment, the first slot C1 is disposed opposite to the second slot C2; and in other embodiments, the first slot C1 and the second slot C2 may be disposed on the same side.

The materials of the outer frame 37 and the support plate 36 may be the same or different. For example, the support plate 36 may be made of a metal material, and the outer frame 37 is made of plastic and is formed on the support plate 36 by injection molding, to be integrally formed with the support plate 36.

In other embodiments, the outer frame 37 and the support plate 36 may be split structures, and are connected with each other by screw connection, engagement connection, adhesive connection, etc.

In this embodiment, optionally, the first slot C1 and the second slot C2 both have slot surfaces on one sides that are defined by elastic pressure walls 31, so that when the card member is inserted in the first slot C1 or the second slot C2, the pressure wall 31 can elastically press the card member, to make the card member stably mounted in the first slot C1 or the second slot C2 and not easy to fall off naturally. In this embodiment, a bar-shaped cut slot C3 may be provided near the first slot C1 or the second slot C2 of the outer frame 37, and an entity portion of the outer frame 37 that is located between the bar-shaped cut slot C3 and the first slot C1 may serve as the pressure wall 31. After the card member is inserted in the first slot C1 or the second slot C2, the card member can elastically eject the pressure wall 31 towards the side of the bar-shaped cut slot C3, so that the pressure wall 31 is elastically deformed to a certain extent relative to the card holder 30, to apply an elastic force to the card member. In this embodiment, a support portion 31a protruding towards the side of the corresponding first slot C1 or the second slot C2 is disposed in a middle position of a length direction of the pressure wall 31 on one side of the first slot C1 or the second slot C2, and is configured to bear against the card member mounted in the first slot C1 or the second slot C2.

In other embodiments, the pressure wall 31 may not be disposed, and the card member is fixed by a pressing structure in other forms.

Referring to FIG. 6 to FIG. 10, the single-card holder 30a is formed through differentiated design on the basis of the double-card holder 30b. Specifically, the single-card holder 30a includes a card holder body 35 and a filler 33; the card holder body 35 uses the double-card holder 30b shown in FIG. 2 to FIG. 5; and the filler 33 is filled in the second slot C2 of the card holder body 35 and at least corresponds to part of the identifier region S1. That is, the identifier region S1 may be completely within the coverage of the filler 33, and may also be partially within the coverage of the filler 33.

In the single-card holder 30a in this embodiment of this application, the filler 33 is filled in the second slot C2, so that the card member cannot be mounted in the second slot C2, to achieve physical fool proofing. The filler 33 of the second slot C2 of the single-card holder 30a corresponds to the identifier region S1, so that a complete identifier cannot be formed in the identifier region S1. Therefore, after an identifier operation is performed on a card holder, if a complete identifier can be detected, it is determined that the card holder is not the single-card holder 30a (which may be the double-card holder 30b), and in this case, the card holder shall be prevented from being mounted in the electronic device 100 of the single-card version.

A method for determining whether the formed identifier is the complete identifier includes: if information carried by an actually-formed identifier is consistent with information to be formed and can be recognized by a recognition device, considering that the identifier is the complete identifier; otherwise, considering that the identifier is not the complete identifier.

For example, the complete identifier to be formed is a string of characters, such as "123456", and if an identifier formed through a laser engraving operation can be read by the recognition device to be "123456", the identifier formed through laser engraving is the complete identifier; otherwise, if the identifier formed through the laser engraving operation is unable to be recognized by the recognition device to be "123456" (for example, no character can be read or only part of the characters such as "2", "4", "6", etc. can be read), the formed identifier is not the complete identifier.

The filler 33 in this embodiment may be connected to the card holder body 35 by a connection structure such as an engagement connection structure, a threaded connection structure, or an adhesive connection structure. The filler 33 may also be integrally formed with the card holder body 35, and this application is not limited thereto. The material of the filler 33 may be the same as or different from that of the outer frame 37 or the support plate 36 of the card holder body 35.

The filler 33 may be filled in the second slot C2, and may also be filled in only part of the second slot C2. However, it needs to be ensured that the card member cannot be inserted in the filled second slot C2, and the filler 33 can prevent the complete identifier from being formed.

For example, the support plate 36 is made of a metal plate, the material of the second plate surface P2 of the support plate 36 includes a metal, and the identifier is the laser engraved identifier. The filler 33 and the outer frame 37 are integrally formed on the support plate 36 in an injection molding manner through a plastic material. The support plate 36 is made of metal, so that higher support strength can be provided. The outer frame 37 and the filler 33 are made of plastic, so that a complex structure is formed to match the card base 11 and/or the card member. In addition, the support plate 36 and the filler 33 are made of different materials, so that the material of the second plate surface P2 (i.e., the slot bottom surface of the second slot C2) of the support plate 36 is different from the material of the surface of the filler 33. In this way, the identifier that can be formed in the identifier region S1 corresponding to on the second plate surface P2 cannot be completely or clearly formed on the surface of the filler 33, so that the single-card holder 30a can be recognized.

In this embodiment, a region of the filler 33 corresponding to the identifier region S1 may also be provided with a notch C4, and a cross section of the notch C4 is smaller than the identifier region S1. Therefore, even if materials of the filler 33 and the second plate surface P2 in the region of the corresponding identifier region S1 are the same, the identifier may be difficult to clearly present because one portion is formed on the surface of the filler 33 and the other portion is formed on a bottom surface of the notch C4, so that the identifier cannot be completely formed or recognized. The notch C4 may be designed to run through the filler 33, or the notch C4 is disposed so that a recessed depth is less than the thickness of the filler 33, that is, not running through the filler 33. The purpose of this is that, when a device performs laser engraving, due to focal length limitation of laser engraving, the laser engraving device has a certain limit on the depth of the notch C4, for example, within 0.5 mm. When the depth of the notch C4 is greater than 0.5 mm, the laser engraved identifier cannot be clearly presented. Therefore, in this embodiment, the depth of the notch C4 is set to be greater than a laser engraved focal length. For example, the notch C4 may be designed to run through the filler 33. Definitely, the notch C4 is only qualified for the laser engraving device with corresponding performance, and for the laser engraving devices with different performance or other identifier formation devices, there may be no limitation on the depth of the notch C4 or other limitations may be made to the depth of the notch.

In some implementations, the identifier region S1 is in a bar shape; there are a plurality of notches C4; and the plurality of notches C4 are arranged at intervals in a length direction Y2 of the identifier region S1. In this embodiment, the length direction Y2 of the identifier region S1 is perpendicular to a direction in which the card holder is snapped in or pulled out from the electronic device 100; and in other embodiments, the length direction Y2 may also be parallel to the direction in which the card holder is snapped in or pulled out from the electronic device 100 or in an oblique direction.

In some other implementations, the identifier region S1 may also be in a ring shape, a rectangular shape, or other shapes, and accordingly, the plurality of notches C4 may be distributed in a ring, a matrix, or other forms.

Through the arrangement of the plurality of notches C4, during a process of forming an identifier, the identifier may be disconnected respectively at the plurality of notches C4, so that the incompleteness of the identifier is further improved, and the identifier is more difficult to recognize. For example, the identifier is a character string "123456", three notches C4 may be disposed and respectively correspond to portions where characters "2", "4", and "6" are formed, so that after the laser engraving operation, characters "1", "3", and "5" may be formed on the surface of the filler 33, and the characters "2", "4", and "6" cannot be formed or respectively formed on bottom surfaces of the three notches due to height differences, and therefore, the recognition device cannot recognize a complete identifier.

For example, in addition to the plastic, the material of the filler 33 may include glass, rubber, or other materials.

For example, the filler 33 may be disposed in any position of the card holder, and corresponds to the identifier region (e.g., a laser engraved position) of a device (e.g., the laser engraving device) for forming an identifier. Definitely, in some cases, the notch C4 may not be disposed, but the identifier is prevented from being completely or clearly formed by using the difference between the material of the surface of the filler 33 and the material of the slot bottom surface of the second slot C2.

Figure 2:
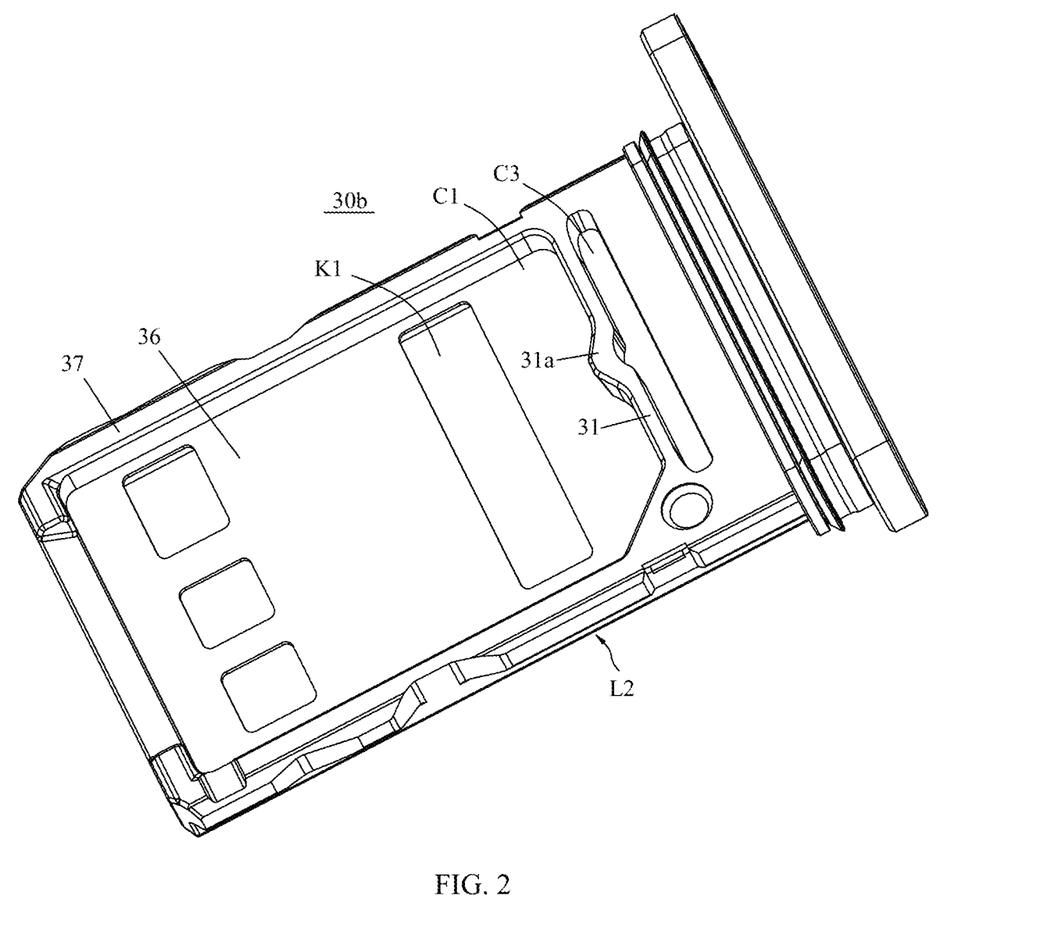
FIG. 2 is a three-dimensional view of a double-card holder according to some embodiments of this application.
Figure 3:
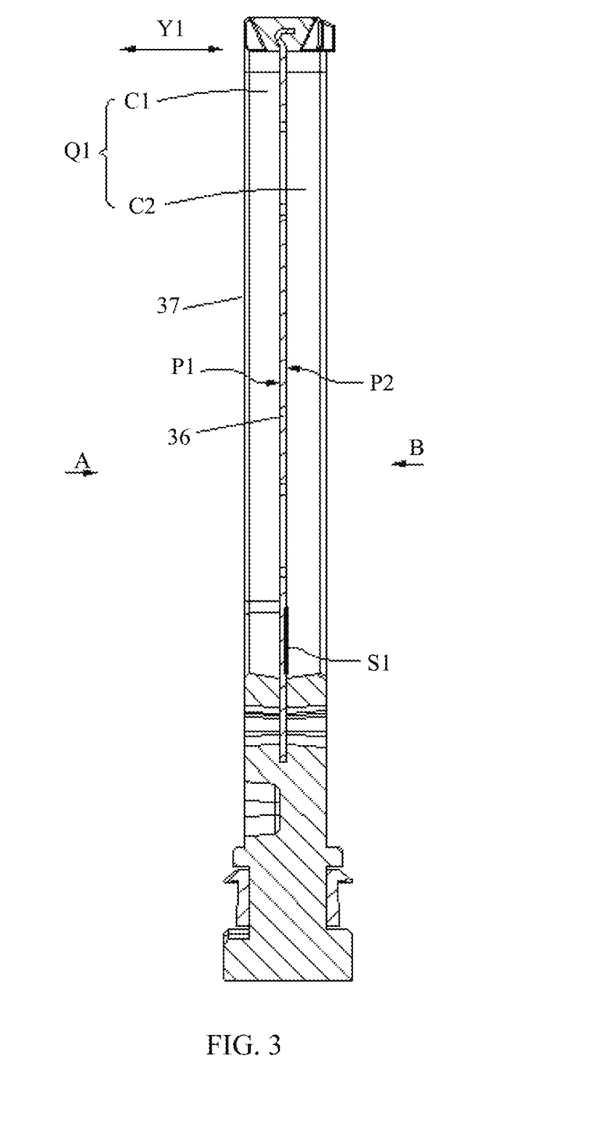
FIG. 3 is a cross-sectional view of the double-card holder in FIG. 2.
Figure 4:
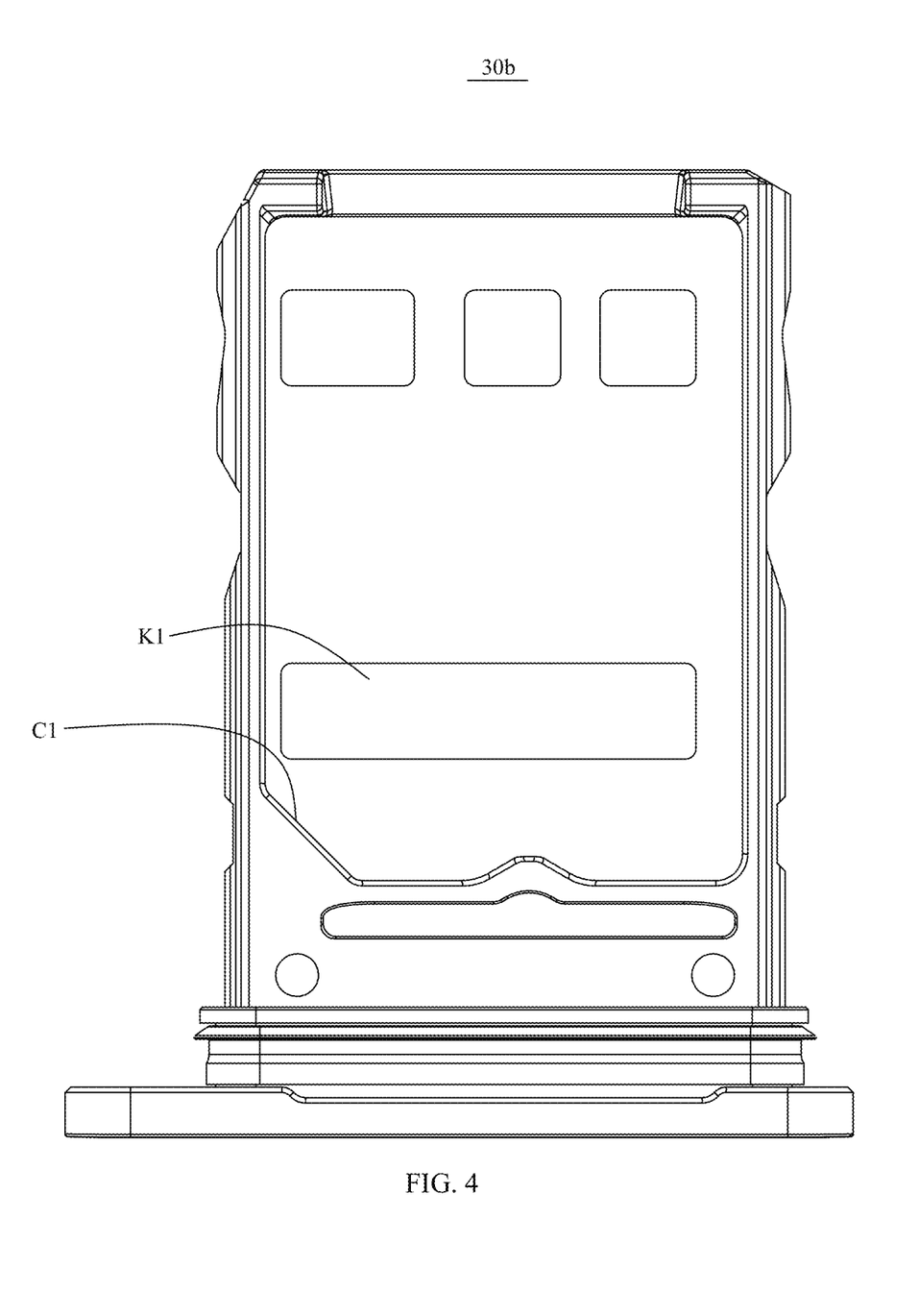
FIG. 4 is an A-directional view of the double-card holder in FIG. 3.
Figure 5:
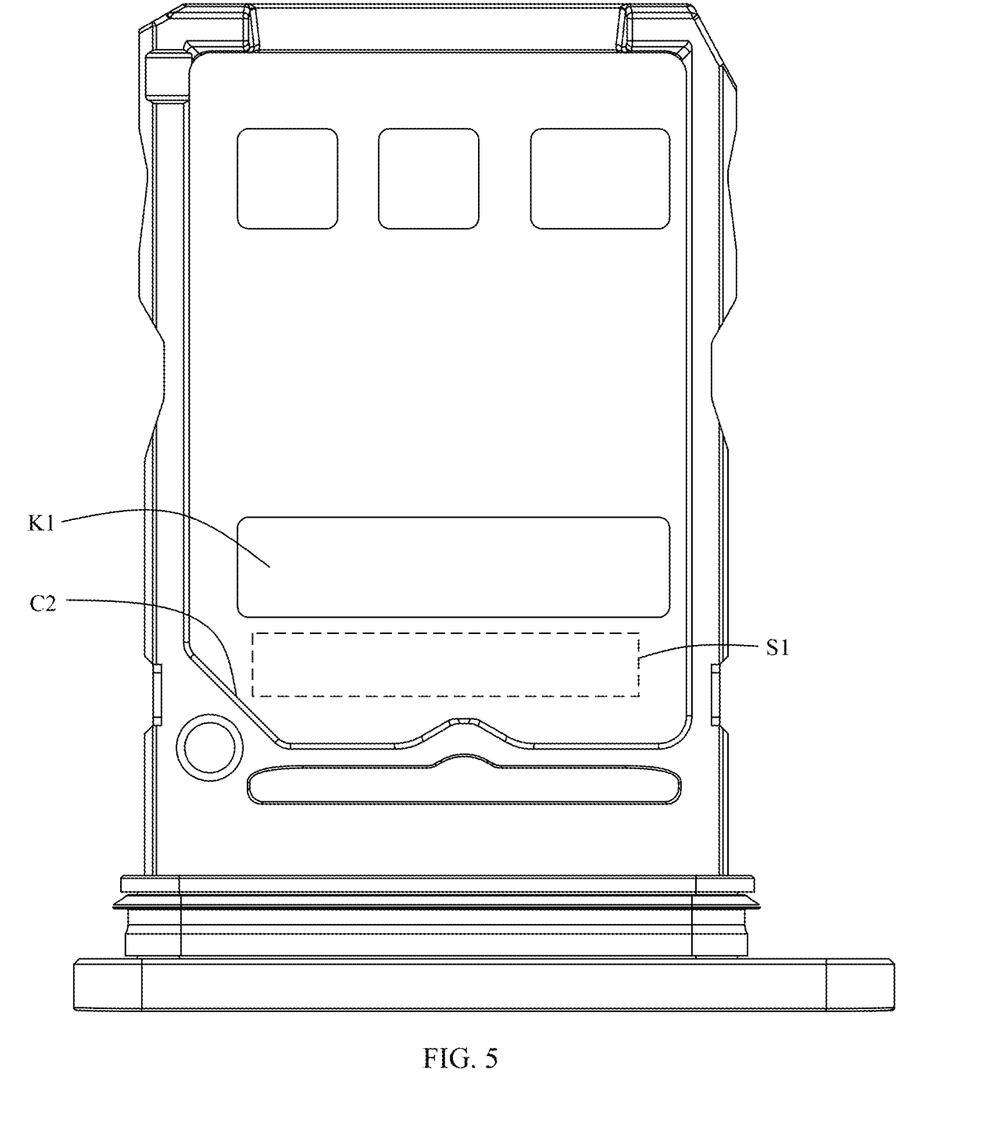
FIG. 5 is a B-directional view of the double-card holder in FIG. 3.
Figure 6:
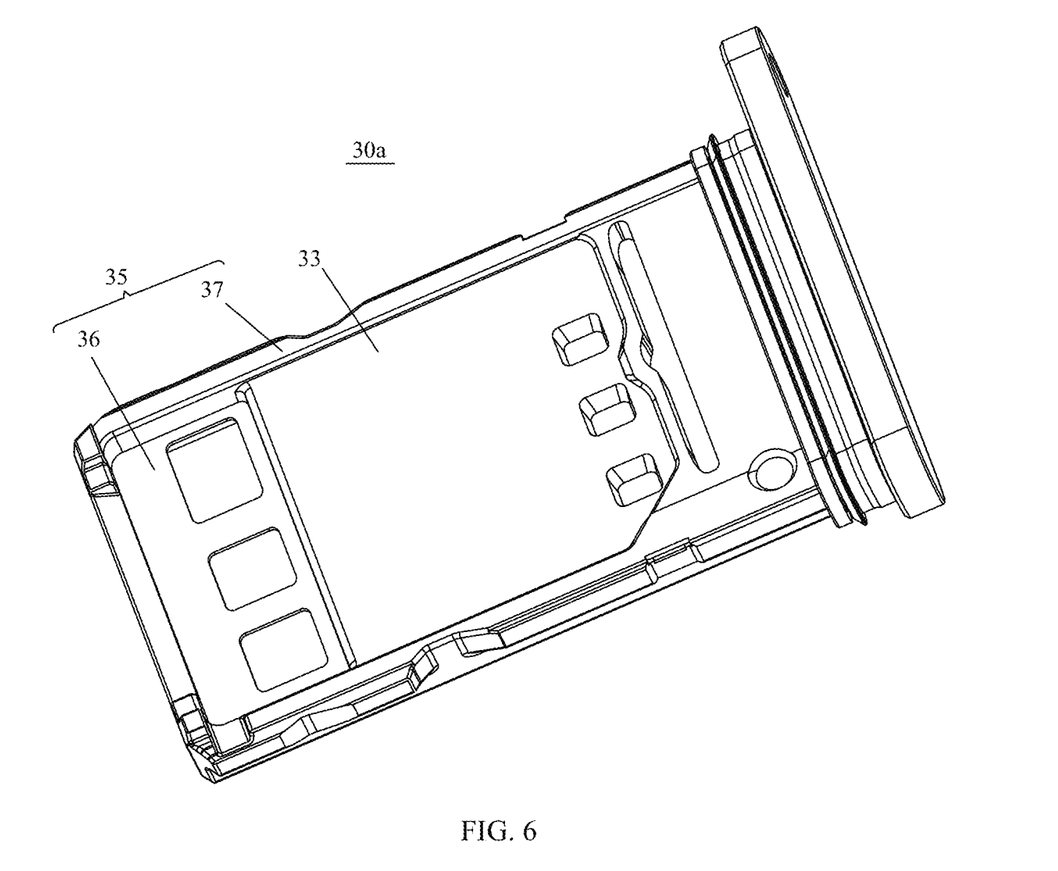
FIG. 6 is a three-dimensional view of a single-card holder according to some embodiments of this application.
Figure 7:
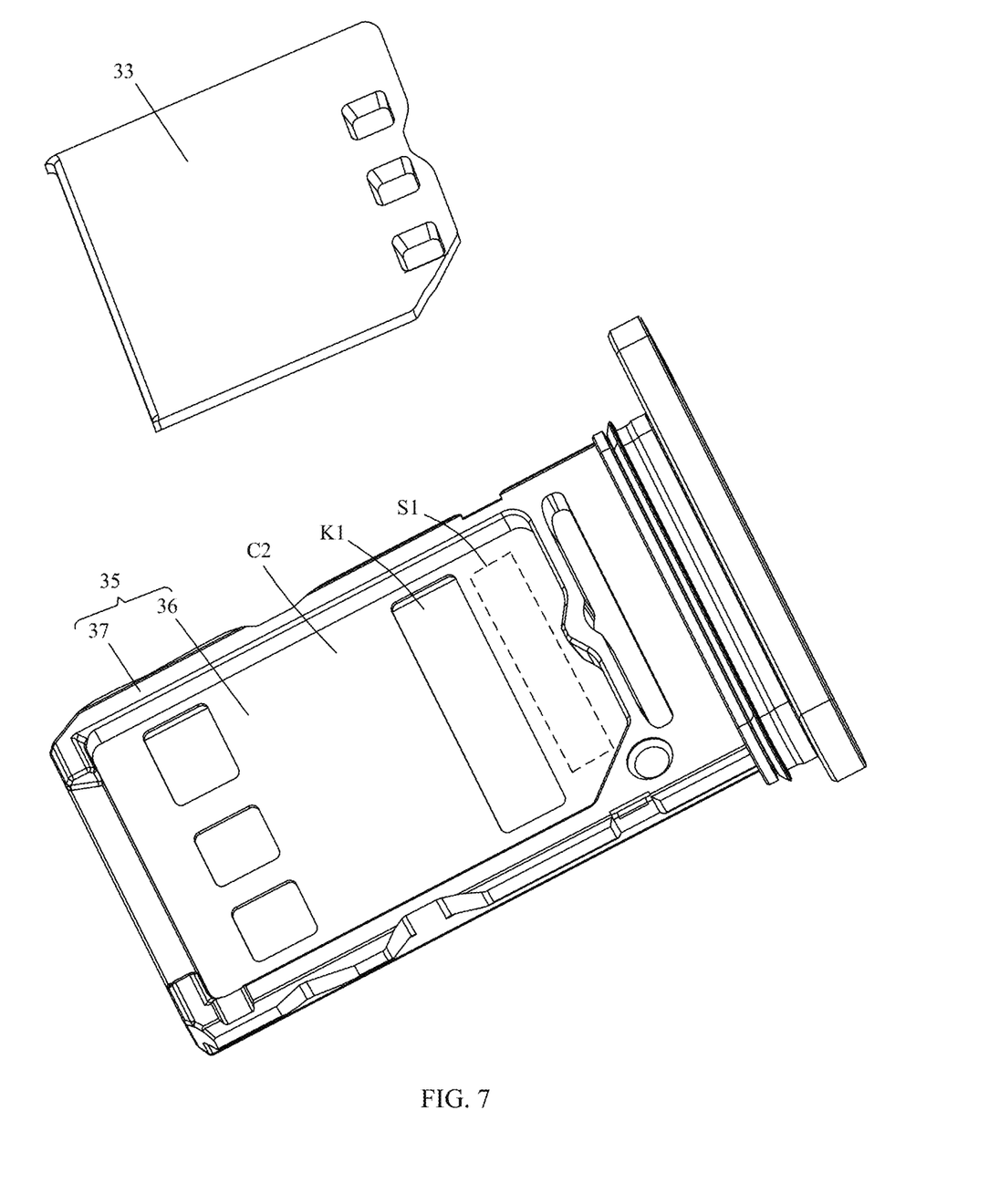
FIG. 7 is an unfolded schematic diagram of an implementation of the single-card holder in FIG. 6.
Figure 8:
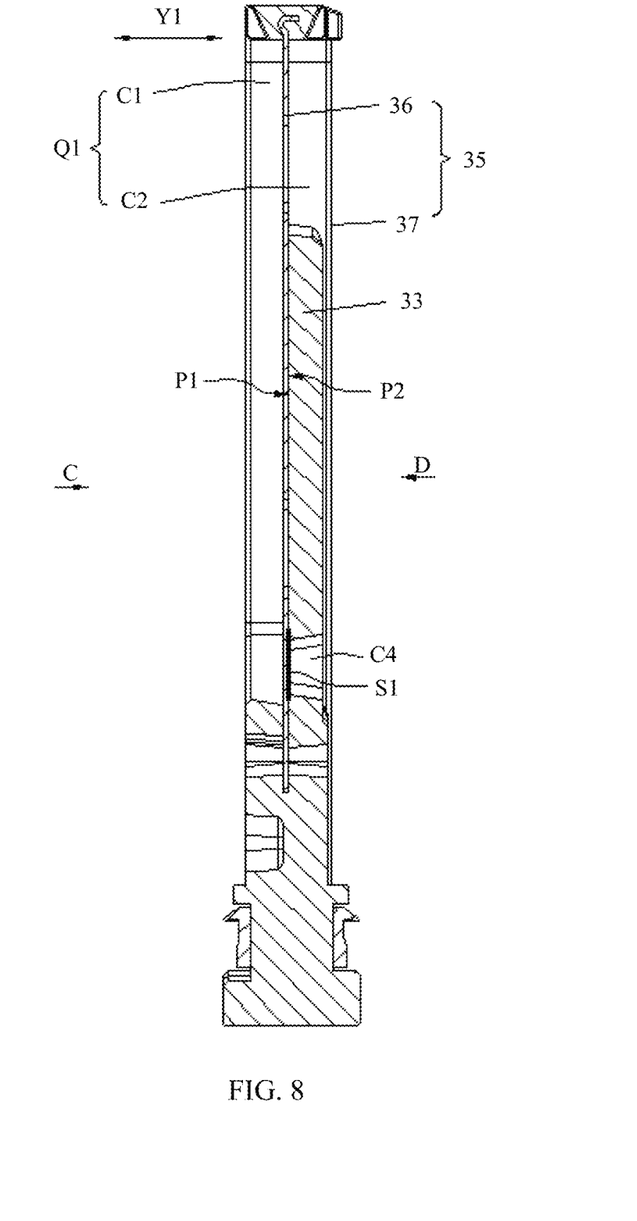
FIG. 8 is a cross-sectional view of the single-card holder in FIG. 6.
Figure 9:
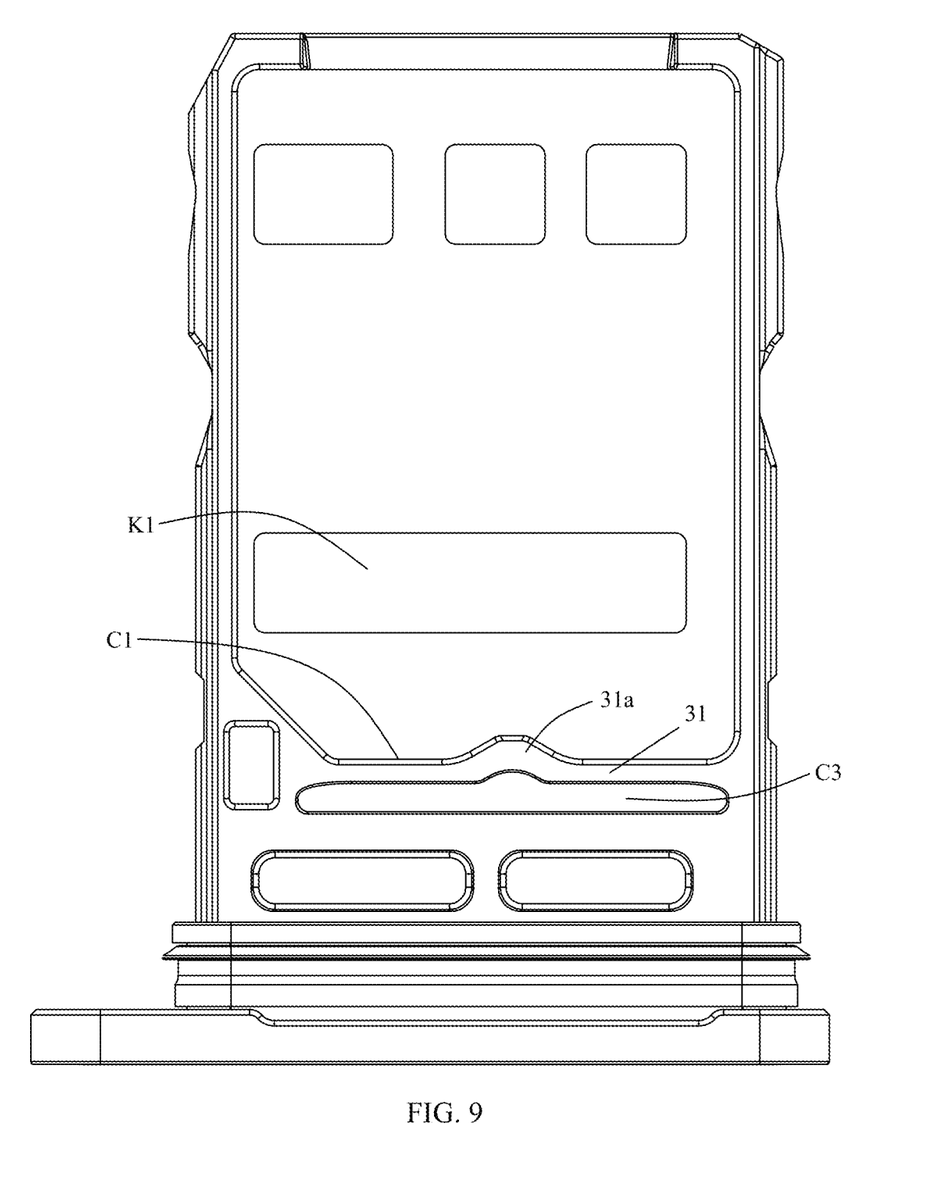
FIG. 9 is a C-directional view of the single-card holder in FIG. 8.
Figure 10:
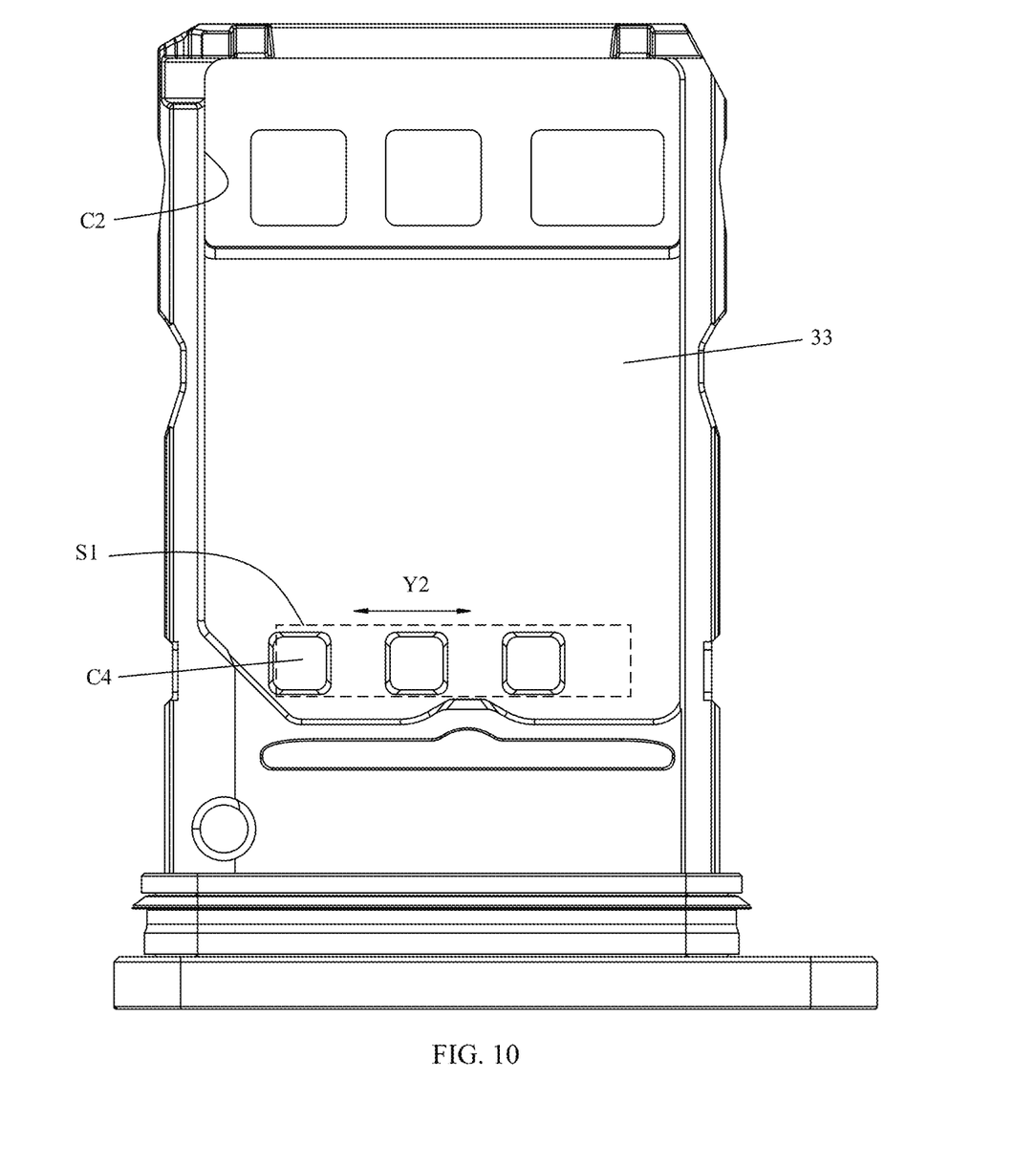
FIG. 10 is a D-directional view of the double-card holder in FIG. 8.

Comparatively referring to FIG. 2 and FIG. 7, in another implementation, the support plate 36 may also be provided with a hollow hole K1 corresponding to the filler 33, and the hollow hole K1 and the identifier region S1 are mutually staggered relative to the position of the second slot C2. The identifier cannot be formed because a portion corresponding to the hollow hole K1 of the double-card holder 30b is hollowed, and the single-card holder 30a may be designed to be able to form an identifier due to the presence of the filler 33. Therefore, the difference between the single-card holder 30a and the double-card holder 30b can be further increased for easy identification.

For the implementation of the card holder provided with the hollow hole K1, when the electronic device 100 of the single-card version is assembled, the identifier forming operation is performed on the identifier region S1 of the selected card holder; if the card holder is the single-card holder 30a, due to the presence of the filler 33 and the notch C4, the identifier cannot be formed or cannot be completely formed; and if the card holder is the double-card holder 30b, the identifier may be formed in a corresponding position. Therefore, whether the card holder is the single-card holder 30a or the double-card holder 30b may be determined through whether the complete identifier can be recognized after the identifier operation. If it is determined that the card holder is the double-card holder 30b, the card holder shall be rejected when the electronic device 100 of the single-card version is assembled.

When the electronic device 100 of the double-card version is assembled, the identifier forming operation is performed on the region of the selected card holder that corresponds to the hollow hole K1; if the card holder is the double-card holder 30b, the portion is hollowed, and the identifier cannot be formed; and if the card holder is the single-card holder 30a, the filler 33 exists at the portion corresponding to the hollow hole K1, and the identifier may be formed on the filler 33. Therefore, whether the card holder is the single-card holder 30a or the double-card holder 30b may be determined through whether the complete identifier can be recognized after the identifier operation. If it is determined that the card holder is the single-card holder 30a, the card holder shall be rejected when the electronic device 100 of the double-card version is assembled.

Based on the single-card holder 30a differentiated relative to the double-card holder 30b, in the production line of the electronic device 100, the following card holder assembly device may be used for recognition and assembly operations of the card holder. Due to the design, the card holder assembly device can reliably avoid a phenomenon of wrongly mounting the card holders during assembly, so that labor costs are saved, and the reliability of detection is improved.

Figure 11:
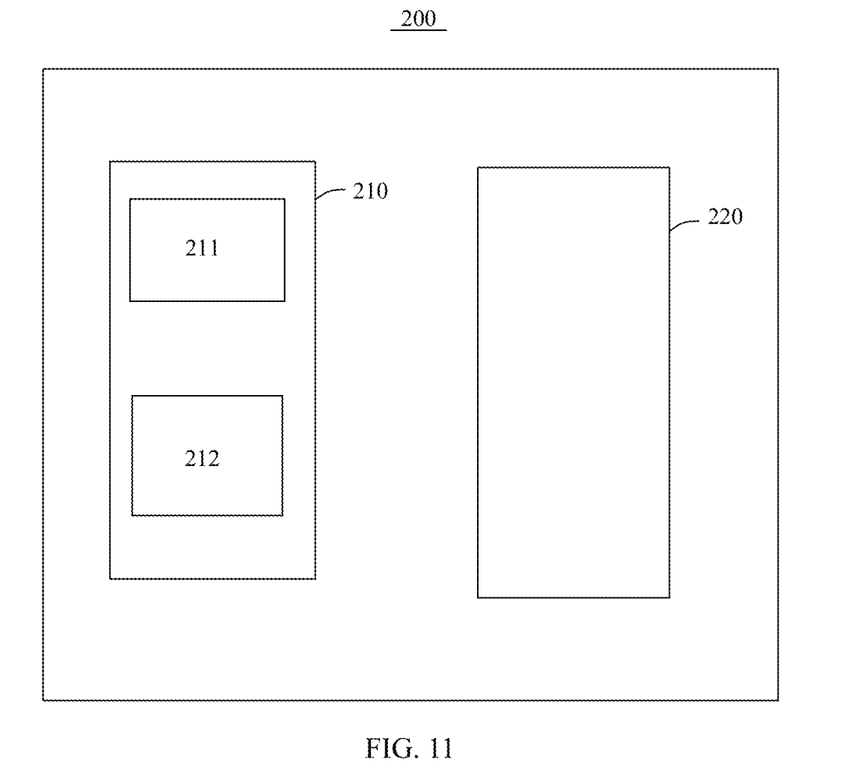
FIG. 11 is a schematic diagram of a card holder assembly device according to an embodiment of this application.

Referring to FIG. 11, an embodiment of this application provides a card holder assembly device 200, which includes a card holder recognition device 210 and an assembled assembly 220. The card holder recognition device 210 is configured to recognize whether a card holder 30 is the single-card holder 30a; and the card holder recognition device 210 includes an identifier assembly 211 and a recognition assembly 212.

The identifier assembly 211 is configured to perform an identifier forming operation on an identifier region S1 of a card holder 30. The identifier forming operation may include laser engraving, spraying, mechanical marking, etc. The formed identifier may be a character string, a graph, a bar code, a two-dimensional code, etc. The character string may be an International Mobile Equipment Identity (International Mobile Equipment Identity, IMEI), a product name, etc.

The recognition assembly 212 is configured to detect the completeness of an identifier, and if a complete identifier is detected, determine that the card holder 30 is not the single-card holder 30a, but may be the double-card holder 30b; and if an incomplete identifier is detected or an identifier cannot be detected, determine that the card holder 30 is the single-card holder 30a. The recognition assembly 212 may include a Charge-coupled Device (Charge-coupled Device, CCD) detection module, and the like.

The assembled assembly 220 may be an assembled manipulator, which is configured to mount the required card holder 30 in a card base 11.

Based on the card holder assembly device 200, this embodiment provides a card holder assembly method, which can reliably prevent the double-card holder 30b from being mounted when an electronic device 100 of a single-card version is assembled. The card holder assembly method includes a card holder recognition method and an assembly operation, and specifically includes the following operations.

The identifier forming operation is performed on the identifier region S1 of the card holder 30, and then an identifier is verified. If a complete identifier can be recognized, it is determined that the card holder 30 is the double-card holder 30b, and the card holder 30 is only configured to be assembled in the electronic device 100 of a double-card version. If no identifier can be recognized or no complete identifier can be recognized, it is determined that the card holder 30 is the single-card holder 30a, and the card holder 30 is only to be assembled in the electronic device 100 of the single-card version.

Figure 12:
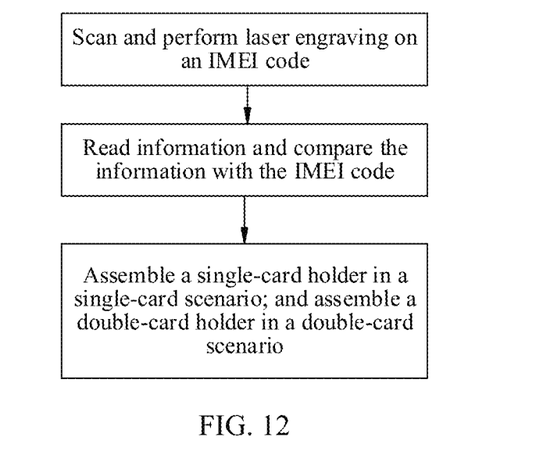
FIG. 12 is a flowchart of a card holder assembly method according to an embodiment of this application.

Referring to FIG. 12, in an example where the electronic device 100 is a mobile phone, the card holder assembly method includes the following specific steps.

Step one: The card holder 30 is placed on a laser engraving fixture, an IMEI code of the mobile phone is obtained through scanning, and a laser engraving operation of the IMEI code is performed on the card holder 30.

Step two: The card holder 30 is taken out to try to read the IMEI code, and read information is compared with the IMEI code of the mobile phone.

Step three: If the read information is the same as the IMEI code of the mobile phone, it is determined that the card holder 30 is the double-card holder 30b and is to be assembled in the mobile phone of a double-card version; and if the read information is different from the IMEI code of the mobile phone, it is determined that the card holder 30 is the single-card holder 30a and is to be assembled in the mobile phone of a single-card version.

To sum up, according to embodiments of this application, through the single-card holder 30a, the filler 33 filled in the second slot C2 and corresponding to the identifier region S1 is disposed, so that the single-card holder 30a can physically prevent a double-card member from being assembled, and can prevent an identifier from being formed or completely formed, facilitating detection and recognition, and thereby greatly reducing the possibility of the double-card holder 30b being mounted in a single-card scenario for use, and ensuring that the quality of products meets requirements.

The foregoing implementations are merely intended for describing the technical solutions of this application but not for limiting this application. Although this application is described in detail with reference to the exemplary implementations, a person of ordinary skill in the art should understand that modifications or equivalent replacements may be made to the technical solutions of this application without departing from the spirit and scope of this application.

The invention claimed is:

1. A single-card holder, comprising a card holder body, wherein the single-card holder has an identifier region for forming an identifier; and
the single-card holder further comprises a filler; the card holder body comprises:
a first slot, which is configured to mount a card member; and
a second slot, which is the same as or different from the first slot, wherein
the filler is filled in the second slot, and at least corresponds to part of the identifier region;
a material of a surface of the filler away from a slot bottom surface of the second slot is different from a material of the slot bottom surface of the second slot, so that the identifier cannot be completely formed on the surface of the filler away from the slot bottom surface of the second slot.

2. The single-card holder according to claim 1, wherein the identifier is a laser engraved identifier; the material of the slot bottom surface of the second slot comprises a metal; and the material of the surface of the filler away from the slot bottom surface of the second slot comprises plastic.

3. The single-card holder according to claim 2, wherein the filler and the card holder body are formed integrally, or
the filler is fixedly connected to the card holder body by a connection structure.

4. The single-card holder according to claim 2, wherein the first slot and the second slot are respectively located on opposite surfaces of the card holder body.

5. An electronic device, comprising:
a card base, and
the single-card holder according to claim 3, wherein the single-card holder matches the card base.

6. A card holder recognition method, for recognizing whether a card holder is the single-card holder according to claim 3, and comprising:
performing an identifier forming operation on an identifier region of a selected card holder; and
performing identifier recognition; if no identifier can be recognized or no complete identifier can be recognized, determining that the card holder is the single-card holder according to claim 2, and the card holder is to be assembled in an electronic device of a single-card version; and if a complete identifier can be recognized, determining that the card holder is a double-card holder of a double-card version corresponding to the single-card holder, and the card holder is to be assembled in an electronic device of the double-card version.

7. The single-card holder according to claim 1, wherein a region of the filler corresponding to the identifier region is provided with a notch, and a cross section of the notch is smaller than the identifier region.

8. The single-card holder according to claim 7, wherein the identifier region is in a bar shape; a plurality of notches are provided; and the plurality of notches are arranged at intervals in a length direction of the identifier region.

9. The single-card holder according to claim 7, wherein the notch runs through the filler,
or
a recessed depth of the notch is less than the filler.

10. The single-card holder according to claim 7, wherein part of the identifier is formed on the surface of the filler, and the other part is formed on the bottom surface of notch, which cannot be completely formed or recognized.

11. The single-card holder according to claim 7, wherein the filler and the card holder body are formed integrally, or
the filler is fixedly connected to the card holder body by a connection structure.

12. The single-card holder according to claim 1, wherein the filler and the card holder body are formed integrally, or
the filler is fixedly connected to the card holder body by a connection structure.

13. The single-card holder according to claim 12, wherein the connection structure is an engagement connection structure, an adhesive connection structure, or a threaded connection structure.

14. The single-card holder according to claim 4, wherein the first slot and the second slot are respectively located on opposite surfaces of the card holder body.

15. The single-card holder according to claim 14, wherein the card holder body comprises an outer frame and a support plate;
an inner space is defined by the outer frame, and the inner space runs through in a thickness direction of the outer frame;
the support plate has a first plate surface and a second plate surface opposite to each other; the support plate is connected to a middle position of the thickness direction of the outer frame, and divides the inner space into the first slot and the second slot that face towards opposite directions; a slot bottom surface of the first slot is defined by the first plate surface, and the slot bottom surface of the second slot is defined by the second plate surface; and the identifier region is located on a side of the second plate surface.

16. The single-card holder according to claim 15, wherein the support plate is a metal plate, and the outer frame and the filler are an integrally-formed plastic structure.

17. An electronic device, comprising:
a card base, and
the single-card holder according to claim 1, wherein the single-card holder matches the card base.

18. A card holder recognition method, for recognizing whether a card holder is the single-card holder according to claim 1, and comprising:
performing an identifier forming operation on an identifier region of a selected card holder; and
performing identifier recognition; if no identifier can be recognized or no complete identifier can be recognized, determining that the card holder is the single-card holder according to claim 1, and the card holder is to be assembled in an electronic device of a single-card version; and if a complete identifier can be recognized, determining that the card holder is a double-card holder of a double-card version corresponding to the single-card holder, and the card holder is to be assembled in an electronic device of the double-card version.

19. The card holder recognition method according to claim 18, wherein
the identifier forming operation comprises laser engraving, spraying, or mechanical marking.

20. The card holder recognition method according to claim 18, wherein
the electronic device comprises a mobile phone, and the card holder is configured to hold a SIM card of the mobile phone; and
the card holder recognition method further comprises:
placing the card holder on a laser engraving fixture, and performing a laser engraving operation of an IMEI code on a side of the card holder, wherein the IMEI code corresponds to the mobile phone matching the card holder;
taking the card holder out, reading the IMEI code, and comparing read information with the IMEI code of the mobile phone;
if the read information is the same as the IMEI code of the mobile phone, determining that the card holder is the double-card holder and is to be assembled in the electronic device of the double-card version; and if the read information is different from the IMEI code of the mobile phone, determining that the card holder is the single-card holder and is to be assembled in the electronic device of the single-card version.

* * * * *